United States Patent
Shah et al.

(10) Patent No.: US 8,321,183 B2
(45) Date of Patent: Nov. 27, 2012

(54) MULTI-VARIABLE CONTROL-BASED OPTIMIZATION TO ACHIEVE TARGET GOAL

(75) Inventors: Amip J. Shah, Santa Clara, CA (US); Cullen E. Bash, Los Gatos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 817 days.

(21) Appl. No.: 12/353,104

(22) Filed: Jan. 13, 2009

(65) Prior Publication Data

US 2010/0179794 A1    Jul. 15, 2010

(51) Int. Cl.
G06F 7/60    (2006.01)
G06F 17/10    (2006.01)

(52) U.S. Cl. .................................. 703/2; 703/1; 703/6

(58) Field of Classification Search .................. 703/2
See application file for complete search history.

(56) References Cited

U.S. PATENT DOCUMENTS

| | | | | |
|---|---|---|---|---|
| 5,850,339 | A * | 12/1998 | Giles ........................... | 700/52 |
| 6,086,617 | A * | 7/2000 | Waldon et al. ............... | 703/2 |
| 7,016,742 | B2 * | 3/2006 | Jarrell et al. ................ | 700/28 |
| 2008/0319812 | A1 * | 12/2008 | Sousa et al. .................. | 705/7 |
| 2010/0083200 | A1 * | 4/2010 | Song et al. ................... | 716/5 |
| 2010/0100405 | A1 * | 4/2010 | Lepore et al. ................ | 705/7 |

OTHER PUBLICATIONS

Munaux, O., "CAD Interface and Framework for Curve Optimisation and Applications", Thesis, Cranfield University, 2000, pp. 1-38.*
Bates et al, "Computer Experiments for Concurrent Engineering", European Congress on Computational Methods in Applied Sciences and Engineering, 2000.*
Chen et al, "A Systematic Methodology of Material Selection with Environmental Considerations", Proceedings, 1994 International Symposium on Electronics and the Environment, pp. 252-257, May 1994.*
Nielsen et al, "Integration of Environmental Aspects in Product Development: a Stepwise Procedure Based on Quantitative Life Cycle Assessment", Journal of Cleaner Production, 10, pp. 247-257, 2002.*
Wang et al, "Applying Multi-objective Genetic Algorithms in Green Building Design Optimization", Building and Environment 40, pp. 1512-1525, 2005.*

* cited by examiner

*Primary Examiner* — Mary C Jacob

(57) ABSTRACT

In a computer-implemented method of designing at least one system to achieve a target goal, an inventory of a plurality of variables that affect the design of the at least one system is created, where the inventory includes a feasibility range for each of the plurality of variables contained in the inventory is created. In addition, initial values are assigned for the plurality of variables in the inventory and a model of input to output correlations of the plurality of variables is created by commissioning the plurality of variables from the initial values. Moreover, a design of the at least one system to achieve the target goal is optimized by manipulating one or more of the plurality of variables through application of the model.

15 Claims, 4 Drawing Sheets

MULTI-VARIABLE CONTROL-BASED OPTIMIZATION TO ACHIEVE TARGET GOAL

CROSS-REFERENCE TO RELATED DISCLOSURE

The present application shares some common subject matter with commonly assigned and copending U.S. patent application Ser. No. 12/254,571 filed on Oct. 20, 2008, which claims priority to U.S. Provisional Patent Application Ser. No. 60/990,438, filed on Nov. 27, 2007, the disclosures of which are hereby incorporated by reference in their entireties.

BACKGROUND

There has been increasing focus on reducing the environmental impact of many products due to ever increasing concerns over the detrimental effects on human health and on the environment. One way to measure the environmental impact of a product is to evaluate the environmental impact through an approach known as life-cycle assessment (LCA), which considers a product across its entire life-cycle from extraction of raw materials, through manufacturing processes, transportation, operation, and end of life recycling. Conventional LCA methods use numerous input and output variables. The input variables often include hundreds, if not thousands of materials, processes, and related data, such as, mass and energy consumption. The output variables often include one or more environmental impact metrics, such as, greenhouse gas emissions, resource consumption, toxicity, and health damage.

Often, given a particular LCA, it is not intuitive to a product designer as to how the product attributes (input variables) are to be modified to reduce the environmental impact of a product (output variables). As such, designers are currently required to iteratively attempt multiple configurations for the products and to re-run the LCA on the multiple configurations to evaluate whether the iterated design has successfully reduced the environmental impact of the product. This is often a time consuming and laborious process for the designer because of the large number of possible input variables, and often may not lead to a feasible solution even after multiple iterations are performed.

In other instances, product designers have attempted generic design optimization and techniques, which include approaches for multi-objective design. These objectives may broadly be categorized as DfX (Design for X), where X may for example refer to the environment, recycling, or manufacturing. In most of these instances, the product designer is required to manually expend additional time and resources, which is often significant. Moreover, DfX requires specialized expertise and is therefore difficult to implement in general-purpose product design tools.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein are a system and method of designing at least one system to achieve a target goal. As disclosed herein, an inventory of variables that affect the design of the at least one system is created. In addition, a model of the variables is created and the design of the at least one system is optimized to achieve a target goal based upon the model.

Through implementation of the methods and systems disclosed herein, the information contained in the inventory may be employed to design any number of various types of products and for various target goals. As such, the methods and systems disclosed herein may enable for the various types of products to be designed without requiring that the inventory be created for each of the products. In addition, the methods and systems disclosed herein enable for a relatively large number of variables to be inventoried and modeled concurrently, which generally improves determination of an optimized design for at least one system that meets a target goal.

Figure 1:
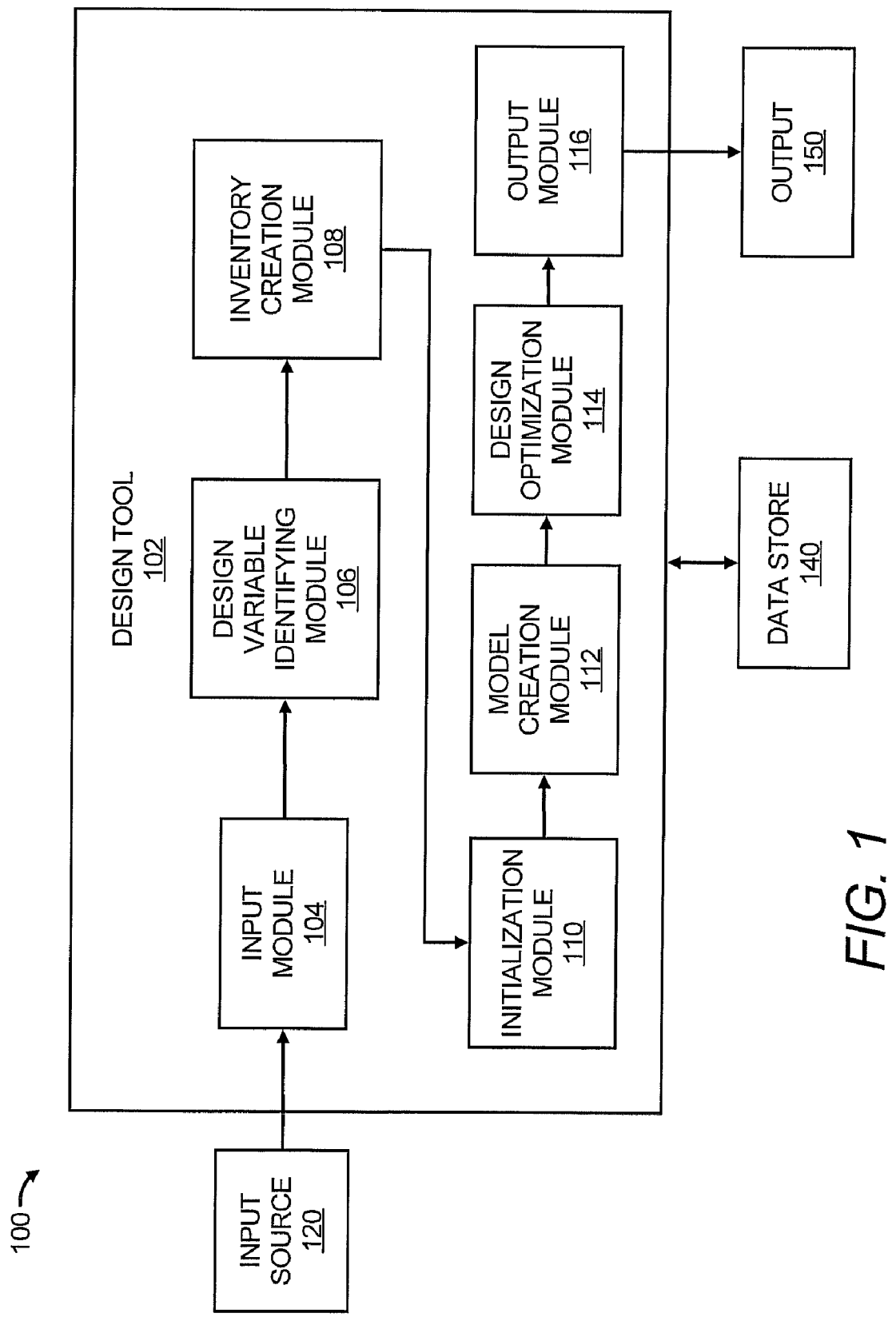
FIG. 1 shows a simplified block diagram of a system for designing at least one system to achieve a target goal, according to an embodiment of the invention.

With reference first to FIG. 1, there is shown a simplified block diagram of a system 100 for designing at least one system to achieve a target goal, according to an example. It should be understood that the system 100 may include additional elements and that some of the elements described herein may be removed and/or modified without departing from the scope of the system 100.

As shown, the system 100 includes a design tool 102, which may comprise software, firmware, and/or hardware and is configured to design at least one system to achieve a target goal. According to an example, the design tool 102 comprises a plug-in module for use with another software tool, such as, MCAD, CFD, FEM, etc.

The at least one system may comprise any physical system or group of systems that are manufactured through consumption of resources. In addition, the target goal may comprise one or more of an environmental goal, such as, sustainability, exergy destruction, energy consumption, etc., design criteria, such as, cost, manufacturing time, finishing requirements, etc., and the like.

In any regard, the design tool 102 is depicted as including an input module 104, a design variable identifying module 106, an inventory creation module 108, an initialization module 110, a model creation module 112, a design optimization module 114, and an output module 116. In instances where the design tool 102 comprises software, the design tool 102 may be stored on a computer readable storage medium and may be executed by the processor of a computing device (not shown). In these instances, the modules 104-116 may comprise software modules or other programs or algorithms configured to perform the functions described herein below. In instances where the design tool 102 comprises firmware and/or hardware, the design tool 102 may comprise a circuit or other apparatus configured to perform the functions described herein. In these instances, the modules 104-116 may comprise one or more of software modules and hardware modules configured to perform these functions.

In any regard, the design tool 102 may be executed or implemented to design a system, such as, an electronic apparatus including a desk top computer, a laptop computer, a server, a personal digital assistant, a printer, air conditioning unit components, etc., or a combination of multiple systems, such as, servers on an electronics cabinet, an IT data center, a print factory, an air conditioning system, etc. Other types of apparatus include, for instance, chalkboard erasers, pens, engines, compressors, etc. The apparatus may further be designed as part of combinations of multiple systems, such as, automobiles, aircrafts, ships, etc. Various examples of manners in which the design tool 102 may design individual and multiple systems such that the life cycle of the one or more systems meets a target goal are described herein below.

As shown in FIG. 1, the input module 104 is configured to receive input from an input source 120. The input source 120 may comprise a computing device, through which data may be inputted into the design tool 102. The design tool 102 and the input source 120 may form part of the same computing device or different computing devices. The inputted data may include, for instance, information pertaining to at least one stage in a lifecycle of the at least one system to be designed by the design tool 102. The stages of the lifecycle of the at least one system includes, for instance, creation, implementation, and disposal/re-use. At the creation or fabrication stages, there are a number of parameters (or variables) that may be modified, which affects a plurality of output metrics of the at least one system during its lifecycle.

By way of example, at the creation or fabrication stage, the different types of materials, suppliers of materials, transportation options of receiving the materials, processing operations of the materials, etc., are all different parameters (variables) that may be modified. In addition, selection of various types of materials and processes employed to extract, fabricate, and construct the at least one system using the various types of material and processes affect a number of various metrics in different ways. For instance, a first type of material may require a great deal of manpower to obtain and fabricate, whereas a second type of compatible material may be easier to obtain and fabricate. However, during implementation of the at least one system, the first type of material may require a greater amount of energy or have a larger carbon footprint than the second type of material.

The inputted data may also include various other information pertaining to the parameters (variables) of the materials and processes that affect the design of the at least one system. The other information may include, for instance, the amount of energy required to fabricate the materials, the amount of time required to collect and manipulate the materials, information pertaining to the compatibility or the ability to substitute materials and/or processes for each other, etc. The other information may also include, for example, various environmental impacts of the various materials and processes, such as, exergy destruction values associated with the various materials, carbon footprints associated with the fabrication and/or use of the various materials and processes, etc.

By way of particular example, the inputted data may include exergy destruction values associated with each of a plurality of candidate materials. The exergy destruction values may be based upon the amount of exergy destroyed during respective extraction and/or fabrication processes of the candidate materials. In addition, or alternatively, the exergy destruction values may be based upon the amount of exergy destroyed during respective disposal processes of the candidate materials. In addition, the exergy destruction values may also be based upon the ability to re-use or reclaim the exergy destroyed during implementation and/or disposal of the candidate materials. The exergy destruction values may further be based upon the amount of exergy destroyed in the respective supply chains associated with the candidate materials. In one regard, therefore, the exergy destruction values may be based upon one or more stages in the respective life cycles of the candidate materials. The respective life cycles may include extraction, fabrication, use, disposal, and re-use of the candidate materials. Examples of manners in which exergy destruction values may be determined are described in the Ser. No. 12/254,571 application for patent.

The inputted data may further include environmental impacts and/or design criteria, such as, cost, manufacturing time, finishing requirements, etc., associated with the at least one system during or after it has been fabricated using various types of materials and/or processes. The environmental impacts and/or design criteria may be based upon various stages of the at least one system lifecycle, such as, during one or more of the fabrication, transportation, use, disposal, and re-use processes.

Additional factors that may be considered in designing the at least one system to achieve a target goal are presented herein below.

In one example, the design tool 102 may be programmed to perform calculations to determine the environmental impacts and/or the other design criteria. In this example, the design tool 102 may be configured to employ one or more conventional lifecycle analysis (LCA) models or techniques in determining the environmental impacts and/or other design criteria. In another example, the environmental impact calculations and/or the other design criteria of the materials and/or processes may be performed through implementation of an environmental impact determination model by an external computing apparatus and the information may be fed into the design tool 102.

According to an example, the input module 104 may provide a graphical user interface through which a user may provide instructions or input information into the design tool 102. The input module 104 may also provide an interface through which a user may supply a target goal for the design of the at least one system to achieve. By way of particular example, the user may employ the input module 104 to instruct the design tool 102 to design a system that has at least one of a minimal carbon footprint, a carbon footprint that falls below a particular value, etc.

The design tool 102 may store the data received from the input source 120 and the user in a data store 140, which may comprise volatile and/or non-volatile memory, such as DRAM, EEPROM, MRAM, flash memory, and the like. In addition, or alternatively, the data store 140 may comprise a device configured to read from and write to a removable media, such as, a floppy disk, a CD-ROM, a DVD-ROM, or other optical or magnetic media.

The design variable identifying module 106 is configured to identify a plurality of variables that may affect the design of the at least one system, and may thus include identification of a number of variables that may not affect the design of the at least one system. According to an example, the design variable identifying module 106 may identify the plurality of variables based upon information inputted into the design tool 102 by a user. According to another example, the design variable identifying module 106 may identify the plurality of variables from one or more databases that contain information pertaining to different materials and/or processes that may be employed to fabricate the at least one system. According to a further example, the design variable identifying module 106 may identify the plurality of variables based upon an initial listing of variables by identifying other variables, from a database, for instance, that are suitably compatible with the initial listing of variables. In any regard and by way of particular example to the at least one system comprising a computing device, the design variable identifying module 106 may identify different grades of plastic or other materials, such as, aluminum, that may be suitable for use in forming a casing of the computing device.

The inventory creation module 108 is configured to create an inventory of the plurality of variables that are relevant to the design of the at least one system as identified by the design variable identifying module 106, which includes a feasibility range for each of the plurality of variables. The feasibility range for each of the plurality of variables may include values assigned to the plurality of variables that are physically realistic for each of the plurality of variables. By way of particular example, the feasibility range of the mass of plastic contained within a laptop may be from 0 up to the mass of the laptop.

According to an example, the inventory creation module 108 is configured to identify and list which of the plurality of variables are independent variables, which comprise those variables that are not affected by changes to other variables. Thus, for instance, a dependent variable may be defined as a variable that changes when at least one other variable is modified. The inventory may also include correlations among dependent variables.

According to a further example, the inventory creation module 108 is configured to fit the independent variables into a plurality of individual category levels. In addition, the independent variables may be arranged in a hierarchical manner in the individual category levels. As a further example, the independent variables may be fit into the plurality of individual category levels through use of heuristics-based operations. As discussed in greater detail herein below, simulations in each of the category levels may be run to determine how the independent variables affect at least one metric of the at least one system and the hierarchy of independent variables may be used to govern how the independent variables fit within the hierarchy. The hierarchy may then be employed to identify which of the independent variables have, for instance, the greatest level of impact on the at least one system.

According to a yet further example, the inventory creation module 108 is configured to employ a statistical simulation, such as, Monte Carlo simulation or a similar technique, to identify the relationships between the design variables by randomly or pseudorandomly simulating selection of each individual variable, which is swept over a defined space to determine the impacts of those individual variables.

The initialization module 110 is configured to assign starting values for the plurality of variables. The starting values of the variables may include, for instance, arbitrary initial values, minimum values of the variables from the feasibility ranges, maximum values of the variables from the feasibility ranges, values for a conventional fabrication of the at least one system, etc. In addition, the initialization module 110 may store the initial settings for each of the variables in the data store 140.

The model creation module 112 is configured to create a model of the input and output correlations of the plurality of variables by commissioning the plurality of variables from the initial values. Generally speaking, the model creation module 112 performs the commissioning process to determine how one or more metrics are impacted when the input variables are modified. The corresponding impact metrics may comprise, for instance, one or more environmental impact metrics, design criteria, etc., resulting from the initial setting of the variables. Thus, by way of particular example, the commissioning process is employed to determine how a change in the volume of a particular material changes greenhouse emissions. In any regard, the model creation module 112 performs the commissioning process on the plurality of variables to develop correlations between the various design variables and the resulting impact metrics. The model creation module 112 may determine the resulting impact metrics through application of a conventional LCA model. According to an example, the model creation module 112 performs the commissioning process by sequentially perturbing one design variable from the initial values of the variables at a time and determining impact metrics resulting from the perturbations. In this example, the model creation module 112 may determine the impact metrics resulting from, for instance, substituting one or more of the materials in the initial design variable with each of a number of known comparable materials.

According to a further example, instead of perturbing each of the variables, the model creation module 112 may perturb selected ones of the variables to thereby reduce the amount of time required to create the model. In one example, the model creation module 112 may perturb only those variables that have been identified as being independent variables. In another example, the model creation module 112 may prioritize the independent variables to determine which of the independent variables are to be perturbed first. In this example, for instance, the independent variables may be prioritized in accordance with the ease, for instance, in practical or cost effective perspective, in which the independent variables may be modified. Thus, for instance, those independent variables that are more easily changed may be perturbed before those independent variables that are more difficult to change.

In another example, various other statistical techniques, such as, design of experiment, may be employed to minimize the number of iterations required to create the model.

The design optimization module 114 is configured to optimize a design of the at least one system to achieve the target goal by identifying values for the plurality of variables through application of the model created by the model creation module 112 that yield the target goal. More particularly, for instance, the design optimization module 114 is configured to determine whether an output value is less favorable than the target goal value and to vary the values of one or more of the variables in response to the output value being less favorable than the target output value. In addition, the design optimization module 114 is configured to use the model to determine whether the corresponding change in the output value is less favorable than the target output value. According to an example, the design optimization module 114 is configured to employ any of a plurality of various optimization techniques on the model to determine the optimized set of variables that yields a design for the at least one system that achieves the target goal. Examples of suitable optimization techniques include steepest gradient descent, simulated annealing, hill-climbing, genetic optimization algorithms, etc. Selection of the optimization technique may be based upon a function of speed, number of variables, non-linearity of variables, etc.

The output module 116 is configured to output the identified set of variables (materials and/or processes) for the design of the at least one system that achieves the target goal to an output 150. The output 150 may comprise, for instance, a display configured to display the identified set of variables. In addition, or alternatively, the output 150 may comprise a fixed or removable storage device on which the identified set of variables is stored. As a further alternative, the output 150 may comprise a connection to a network over which the identified set of variables may be communicated.

Figure 2:
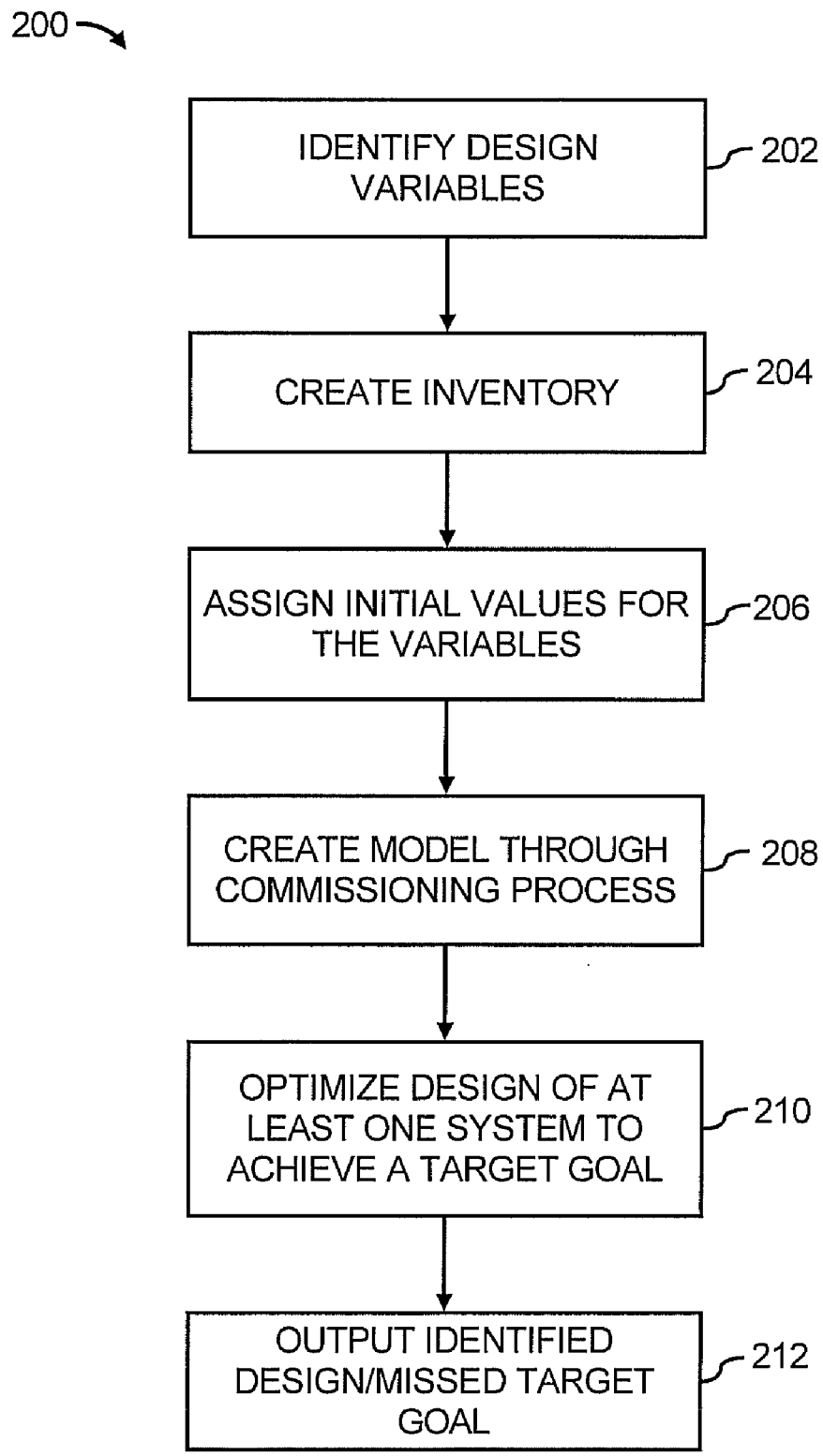
FIG. 2 illustrates a flow diagram of a method of designing at least one system that is configured to meet or achieve a target goal, according to an embodiment of the invention.

Examples of methods in which the system 100 may be employed to design at least one system configured to achieve a target goal will now be described with respect to the following flow diagram of the method 200 depicted in FIG. 2, which is directed to a method of designing at least one system that is configured to meet or achieve a target goal, according to an example. It should be apparent to those of ordinary skill in the art that the method 200 represents a generalized illustration and that other steps may be added or existing steps may be removed, modified or rearranged without departing from a scope of the method 200.

The description of the method 200 is made with reference to the system 100 illustrated in FIG. 1, and thus makes reference to the elements cited therein. It should, however, be understood that the method 200 is not limited to the elements set forth in the system 100. Instead, it should be understood that the method 200 may be practiced by a system having a different configuration than that set forth in the system 100.

A controller, such as a processor (not shown), may implement or execute the design tool 102 to perform one or more of the steps described in the method 200 in designing at least one system that is configured to meet a target goal.

At step 202, which may be an optional step, the design variable identifying module 106 identifies a number of design variables. A user may input the design variables into the design tool 102 or the design variable identifying module 106 may identify the design variables from information contained in one or more databases.

At step 204, the inventory creation module 108 creates an inventory of the design variables that affect the design of the at least one system, which includes a feasibility range for each of the design variables. According to an example, the inventory creation module 108 is configured to identify and list which of the plurality of variables are independent variables, which comprise those variables that are not affected by changes to other variables. In addition, the inventory creation module 108 is further configured to arrange the independent variables in a hierarchy.

At step 206, the initialization module 110 assigns initial values for the plurality of variables. As discussed above, the initial values may be arbitrarily selected, minimum values, maximum values, values corresponding to a conventional fabrication technique of the at least one system, etc.

At step 208, the model creation module 112 creates a model of the input and output correlations of the plurality of variables design variables by commissioning the plurality of design variables from the initial values. In one example, the model creation module 112 performs the commissioning process by sequentially perturbing one or more design variables from the initial values and determining impact metrics resulting from the perturbations. As also discussed above, the model creation module 112 may employ various techniques designed to reduce the amount of time required to create the model, for instance, by prioritizing the independent variables, etc.

At step 210, the design optimization module 114 optimizes a design of the at least one system to achieve a target goal by identifying values for the plurality of variables through application of the model created at step 208 that yield the target goal. According to an example, the design optimization module 114 employs any of a plurality of various optimization techniques on the model to determine an optimized set of design variables that yields a design for the at least one system that achieves a target goal.

Figure 3:
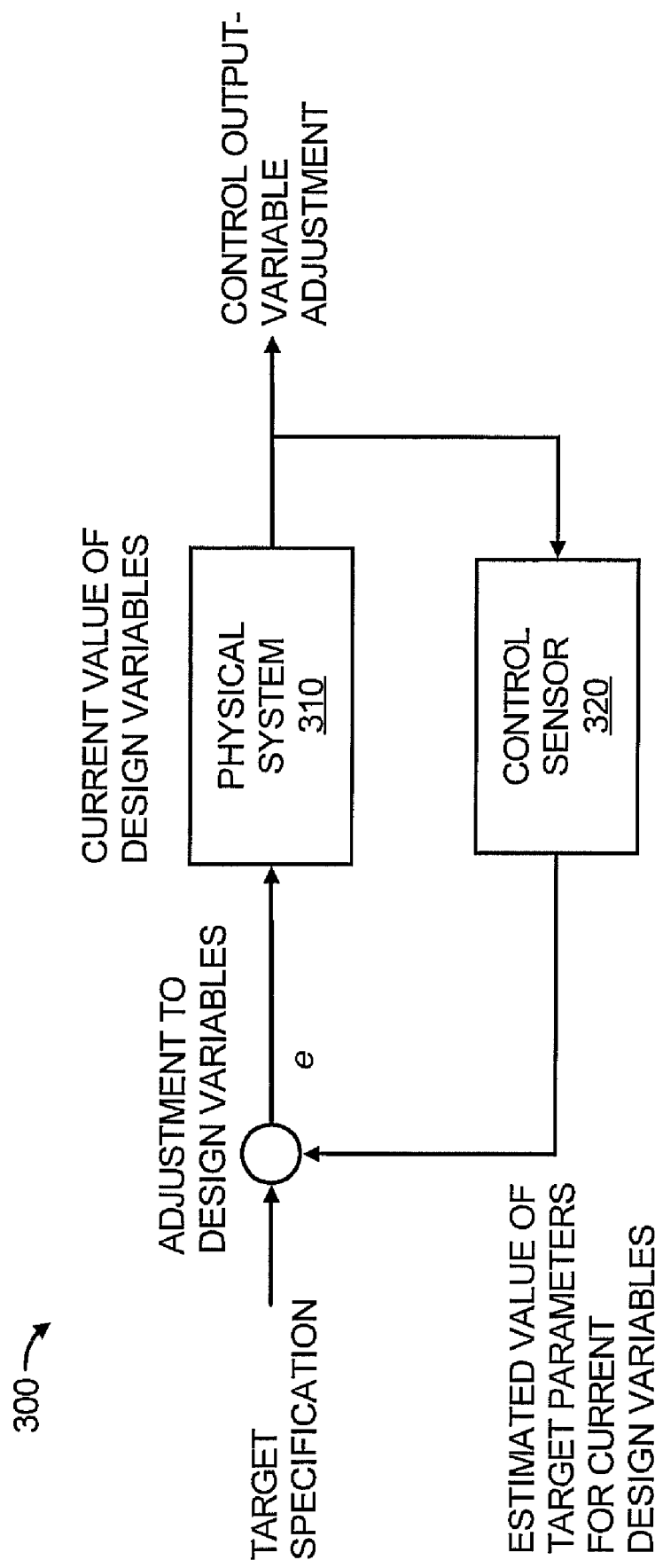
FIG. 3 depicts a diagram of a process flow that the design optimization module of FIG. 1 may implement in determining an optimized set of design variables in the method illustrated in FIG. 2, according to an embodiment of the invention.

A schematic illustration of a manner in which the design optimization module 114 determines the optimized set of design variables is depicted in FIG. 3, according to an example. FIG. 3, more particularly, depicts a diagram 300 of a process flow that the design optimization module 114 may implement to determine the optimized set of design variables. As shown therein, a target specification (goal) is inputted into the design optimization module 114. In addition, a control sensor 320 determines a current output value of the design variables in the physical system 310. The control sensor 320 makes this determination by determining at least one impact metric associated with the current values of the design variables, for instance, through implementation of an LCA model on the design variables. Thus, for instance, during a first iteration, the control sensor 320 determines the output associated with an initial input setting of the design variables to determine an estimated value of the target parameters for a current setting of the design variables, which is similar to step 206 in FIG. 2.

In any regard, the design optimization module 114 compares the determined impact metric(s) with the target specification (goal) to determine whether the determined impact metric(s) is less favorable than the target specification (goal). If the determined impact metric(s) meets or is more favorable than the target specification (goal), the control output is the current values of the design variables. If, however, the determined impact metric(s) is less favorable than the target specification (goal), the design optimization module 114 adjusts at least one of the design variables to thus modify the physical system 310. In addition, the control sensor 320 determines at least one impact metric associated with the value of the design variables as modified, for instance, through implementation of an LCA model on the design variables.

Again, the design optimization module 114 compares the determined impact metric(s) with the target specification (goal). If the determined impact metric(s) is equal to or is more favorable than the target specification (goal), the control output is the modified set of variables. If the determined impact metric(s) is less favorable than the target specification (goal), the design optimization module 114 adjusts at least one of the design variables to again modify the physical system 310 and the control sensor 320 again determines at least one impact metric. The design optimization module 114 may repeat the process discussed above until a set of design variables that meets or is more favorable than the target specification (goal) is achieved.

According to an example, the target specification (goal) comprises a minimized impact metric. In this example, the design optimization module 114 performs the process discussed above until a minimized impact metric is achieved. In addition, the control output in this example comprises a set of variables that results in the minimized impact metric.

In addition, or alternatively, the design optimization module 114 may be configured to decrease the amount of time spent in performing the process depicted in FIG. 3. According to an example, the design optimization module 114 may selectively modify the design variables by, for instance, modifying only those variables that have been identified as being independent, selectively modifying the independent variables according to a hierarchical arrangement of the design variables, etc., during each of the iterations of the process depicted in FIG. 3.

In another example, the design optimization module 114 may employ any of a plurality of various optimization techniques on the input to output model of the design variables to determine an optimized set of variables that yield a design for the at least one system that achieves the target goal.

In any regard, at step 212, the output module 116 outputs a set of design variables that has been identified as achieving the target goal. In other words, the output module 116 outputs the materials and/or processes that are to be implemented in the design of the at least one system that have been identified as achieving the target goal. In certain instances, however, the design optimization module 114 may be unable to determine an optimal design that achieves the target goal. In these instances, the output module 116 may output an indication that the target goal has not been met at step 212. In response, the design tool 102 may receive further variables and/or a modified target goal from a user and the design tool 102 may repeat the method 200 based upon the further variables and/or modified target goal.

A particular example of an application of the method 200 and the process depicted in the diagram 300 of FIG. 3 will now be provided. In this example, the target goal is to minimize the greenhouse gas emissions resulting from manufacture of a laptop. One design variable available to the designer is the amount of plastic used for the casing and, intuitively, reducing the amount of plastic may reduce the amount of energy required to make and mold the plastic, thus reducing the upstream greenhouse gas emissions. The target goal towards which the designer is working is a 10% reduction in the carbon footprint of the laptop.

In this example, an inventory of the available variables to modulate the design is compiled at step 204. For simplicity, in this example, only the amount of plastic is considered as a design variable. The model is initiated with an arbitrary value for the amount of plastic, for instance, the same value (M kg) as the previous generation laptop to determine an initial input to output correlation for the design variable. The initial design variable is correlated with the target goal at step 206 to determine the output correlation. Thus, for instance, the design tool 102 may receive input pertaining to how the carbon emissions emanating from plastic scales with the mass of the plastic. This information may be determined using existing LCA tools. In addition, for the purposes of this example, suppose that M kg of plastic corresponds to C kg of carbon emissions, and for simplicity, assume that this scaling is linear.

As a next step, the desired setpoint, for instance, a 10% reduction in the carbon emissions, or suppose a target value of 0.9 C kg, is identified, which may have previously been inputted into the design tool 102. With these different specifications in place, that is, a target setpoint of 0.9 C kg of carbon emissions, a list of the design variables that can be perturbed (the amount of plastic), and a model (step 208) that helps sense how much emissions result from a unit change in the amount of plastic (C/M kg of carbon emissions per kg of plastic), the process 300 depicted in FIG. 3 may be used to optimize the plastics design for the laptop.

More particularly, the target goal (0.9 C) is inputted to the design optimization module 114. This is compared to the sensed target value (which, based on the initialization, is C). Because the setpoint and actual values are different, the design optimization module 114 will compensate by reducing the amount of plastic. How much the value is reduced by will depend on the specific algorithm used in the design optimization module 114, but this could be as simple as using a fixed amount, such as, 10% change in the amount of plastic. The design optimization module 114 then adjusts the value of the relevant design variable (in this case, the amount of plastic) by this amount, and recalculates the carbon emissions for this new case. The loop is then iterated until the desired target value is reached.

The process described above may also be similarly repeated for multiple design variables, for instance, amount of plastic, processor power consumption, etc., as well as for multiple target metrics, for instance, carbon footprint, cost-of-ownership, processing speed, etc. In addition, the process described above may also be extended beyond just a single product to span sets of products, systems or even ecosystems. In this manner, through implementation of the method and system disclosed herein, the design of any system to meet a set of target parameters may automatically be optimized.

Some or all of the operations set forth in the method 200 may be contained as a utility, program, or subprogram, in any desired computer accessible medium. In addition, the method 200 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 4:
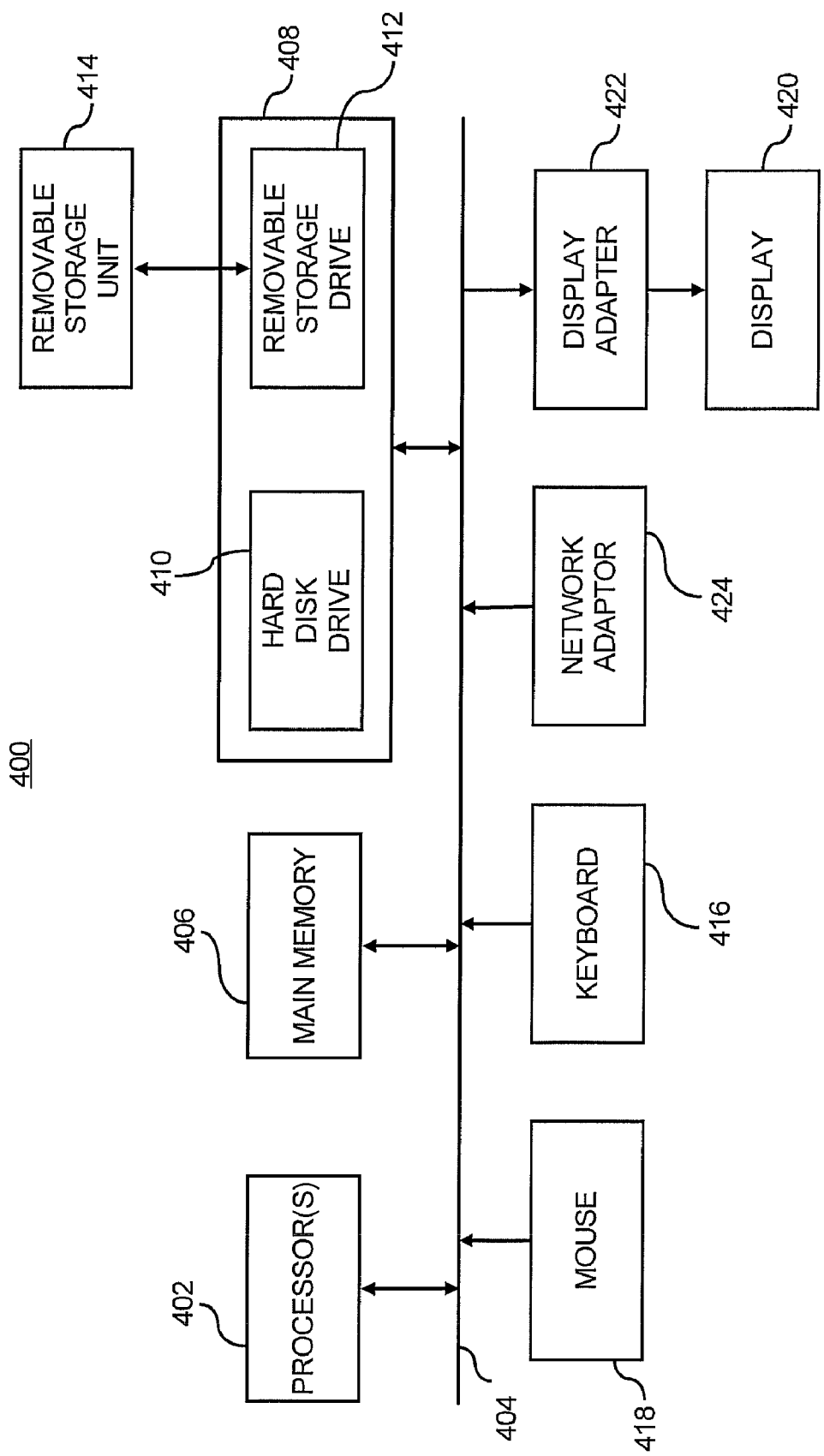
FIG. 4 shows a block diagram of a computing apparatus configured to implement or execute the design tool depicted in FIG. 1, according to an embodiment of the invention.

FIG. 4 illustrates a block diagram of a computing apparatus 400 configured to implement or execute the design tool 102 depicted in FIG. 1, according to an example. In this respect, the computing apparatus 400 may be used as a platform for executing one or more of the functions described hereinabove with respect to the design tool 102.

The computing apparatus 400 includes a processor 402 that may implement or execute some or all of the steps described in the method 200. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, representing a floppy diskette drive, a magnetic tape drive, a compact disk drive, etc., where a copy of the program code for the method 200 may be stored.

The removable storage drive 410 reads from and/or writes to a removable storage unit 414 in a well-known manner. User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

It will be apparent to one of ordinary skill in the art that other known electronic components may be added or substituted in the computing apparatus 400. It should also be apparent that one or more of the components depicted in FIG. 4 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computer-implemented method of designing at least one system to achieve a target environmental goal, said method comprising:
    creating an inventory of a plurality of variables that affect the design of the at least one system, wherein the inventory includes a feasibility range for each of the plurality of variables contained in the inventory, and wherein the plurality of variables pertain to at least one stage in a lifecycle of the at least one system;
    determining which of the plurality of variables are independent;
    determining a respective level of effect of each independent variable on at least one metric of the at least one system based on a simulation that includes selecting each independent variable and sweeping each independent variable over a defined space;
    assigning initial values for the plurality of variables in the inventory;
    creating a model of input to output correlations of the plurality of variables by commissioning the plurality of variables from the initial values; and
    optimizing, by a processor, a design of the at least one system to achieve the target environmental goal by manipulating one or more of the plurality of variables through application of the model, wherein manipulating includes manipulating the independent variables in a particular order based on the respective levels of effects.

2. The computer-implemented method according to claim 1, wherein the method includes:
    determining whether an optimal design to achieve the target environmental goal has been met; and
    outputting settings of the plurality of variables that yield the optimal design in response to the target environmental goal being met.

3. The computer-implemented method according to claim 2, wherein the method includes further modifying one or more of the plurality of variables to identify an optimal design in response to an optimal design not being identified.

4. The computer-implemented method according to claim 2, wherein the method includes outputting an indication that the target goal has not been met in response to a determination that an optimal design has not been identified.

5. The computer-implemented method according to claim 1, wherein the method includes:
    receiving the target environmental goal, wherein the target environmental goal comprises a goal selected from the group consisting of sustainability, exergy destruction, and energy consumption pertaining to at least one lifecycle of the at least one system.

6. The computer-implemented method according to claim 1, wherein the method includes sequentially perturbing a plurality of the variables and determining input and output correlations of the perturbed plurality of variables.

7. The computer-implemented method according to claim 6, wherein the method includes implementing a statistical technique to reduce a number of iterations required to determine the input to output correlations of the perturbed plurality of variables.

8. The computer-implemented method according to claim 1, wherein the method includes identifying which of the plurality of variables are independent variables, and wherein creating the model further comprises creating the model through use of only the plurality of variables identified as independent variables.

9. A system for designing at least one system to achieve a target environmental goal, comprising:
    a processor; and
    a memory storing instructions executable by the processor to:
        identify a plurality of variables that affect the design of the at least one system;
        create an inventory of the plurality of variables, wherein the inventory includes a feasibility range of each of the plurality of variables contained in the inventory, and wherein the plurality of variables pertain to at least one stage in a lifecycle of the at least one system;
        determine which of the plurality of variables are independent; and
        determine a respective level of effect of each independent variable on at least one metric of the at least one system based on a simulation that includes selecting each independent variable and sweeping each independent variable over a defined space;
        assign starting values for the plurality of variables;
        create a model of input to output correlations of the plurality of variables by commissioning the plurality of variables from the starting values;
        optimize a design of the at least one system to achieve the target environmental goal by manipulating one or more of the plurality of variables through application of the model, wherein manipulating includes manipulating the independent variables in a particular order based on the respective levels of effects, and wherein the target environmental goal comprises a goal selected from the group consisting of sustainability, exergy destruction, and energy consumption pertaining to at least one lifecycle of the at least one system.

10. The system of claim 9, wherein the instructions include instructions to:
    receive data regarding at least one of one or more material and one or more process options for the fabrication of the at least one system; and
    identify the design variables that affect the design of the at least one system from the received data.

11. The system of claim 9, wherein the instructions include instructions to sequentially perturb a plurality of variables and to determine input and output correlations of the perturbed plurality of variables in creating the model.

12. The system of claim 11, wherein the instructions include instructions to implement a statistical technique to reduce a number of iterations required to determine the input to output correlations of the perturbed plurality of variables.

13. The system of claim 9, wherein the instructions include instructions to to create the model through use of only the independent variables.

14. A non-transitory computer readable storage medium storing instructions thereon, the instructions executed by a processor to:
    create an inventory of the plurality of variables that affect the design of the at least one system, wherein the inventory includes a feasibility range for each of the plurality of variables contained in the inventory, and wherein the plurality of variables pertain to at least one stage in a lifecycle of the at least one system;

determine which of the plurality of variables are independent;

determine a respective level of effect of each independent variable on at least one metric of the at least one system based on a simulation that includes selecting each independent variable and sweeping each independent variable over a defined space;

assign initial values for the plurality of variables in the inventory;

create a model of input to output correlations of the plurality of variables by commissioning the plurality of variables from the initial values; and optimize a design of the at least one system to achieve the target environmental goal by manipulating one or more of the plurality of variables through application of the model, wherein manipulating includes manipulating the independent variables in a particular order based on the respective levels of effects.

15. The non-transitory computer readable storage medium according to claim 14, wherein the instructions include instructions to:

determine whether an optimal design to achieve the target environmental goal has been met, wherein the target environmental goal comprises a goal selected from the group consisting of sustainability, exergy destruction, and energy consumption pertaining to at least one lifecycle of the at least one system; and output settings of the plurality of variables that yield the optimal design in response to the target environmental goal being met.

* * * * *

UNITED STATES PATENT AND TRADEMARK OFFICE
CERTIFICATE OF CORRECTION

PATENT NO. : 8,321,183 B2
APPLICATION NO. : 12/353104
DATED : November 27, 2012
INVENTOR(S) : Amip J. Shah et al.

Page 1 of 1

It is certified that error appears in the above-identified patent and that said Letters Patent is hereby corrected as shown below:

In the Claims:

In column 12, line 61, in Claim 13, after "instructions" delete "to".

Signed and Sealed this
Fourteenth Day of May, 2013

Teresa Stanek Rea
*Acting Director of the United States Patent and Trademark Office*